United States Patent [19]

Hefele

[11] 4,080,347

[45] Mar. 21, 1978

[54] MODIFIED HOT MELTING ADHESIVE POWDERS

[75] Inventor: Josef Hefele, Grafelfing, Germany

[73] Assignee: Kufner Textilwerke KG, Munich, Germany

[21] Appl. No.: 709,335

[22] Filed: Jul. 28, 1976

[30] Foreign Application Priority Data

Jul. 28, 1975 Germany .............................. 2533729

[51] Int. Cl.$^2$ ............................................. C08G 69/46
[52] U.S. Cl. .................. 260/18 N; 260/28 R; 260/30.8 R; 260/31.8 N; 260/32.6 NA; 260/78 S; 156/321; 427/222; 428/355; 428/474
[58] Field of Search ............... 428/355, 474; 427/222; 260/78 S, 30.8 R, 18 N, 32.6 NA, 31.8 N, 28; 156/321

[56] References Cited

U.S. PATENT DOCUMENTS

| | | | |
|---|---|---|---|
| 2,992,456 | 7/1961 | Pearson et al. | 427/222 |
| 3,035,003 | 5/1962 | Kessler | 428/407 |
| 3,156,665 | 11/1964 | Brossman et al. | 428/407 |
| 3,591,409 | 7/1971 | Aubrey et al. | 428/407 |
| 3,948,844 | 4/1976 | Raabe et al. | 260/30.8 R |
| 3,950,297 | 4/1976 | Raabe et al. | 260/30.8 R |

FOREIGN PATENT DOCUMENTS

| | | | |
|---|---|---|---|
| 697,168 | 11/1964 | Canada | 427/422 |
| 2,164,419 | 7/1973 | France. | |
| 826,920 | 1/1960 | United Kingdom | 427/422 |

*Primary Examiner*—Eugene C. Rzucidlo
*Attorney, Agent, or Firm*—Hill, Gross, Simpson, Van Santen, Steadman, Chiara & Simpson

[57] ABSTRACT

Preparing modified hot melting adhesive powders by adding melting point and fusion viscosity depressing agents in powder form to powdered polyamides, wherein the mixture granules are tempered until the added agents are distributed in the polyamide granules substantially to a level of molecular uniformity.

12 Claims, No Drawings

MODIFIED HOT MELTING ADHESIVE POWDERS

This invention relates to modified hot melting adhesive powders, to a method for their preparation, and to their use.

The preparation of modified hot melting adhesive powders by adding melting point and fusion viscosity depressing agents in powder form to powdered polyamides is known. Products of this type are already used for coating liners, and consist of granule mixtures of powdered copolyamides ground to a particle size distribution of less than about 200 μ, and very finely ground plasticizer powder of o,p-toluenesulphonamide (commercially available mixture of o-and p-toluenesulphonamides) with a particle size distribution of less than about 20 μ. These powder mixtures generally contain large polyamide granules and very fine o,p-toluenesulphonamide granules next to each other. This commercially available granule mixture is prepared by grinding the two products separately and then mechanically mixing them. By adding the plasticizer, heat-sealing can be carried out under mild fixing conditions.

The disadvantage in using these mixtures is that they can only be used efficiently in the powder print-on process, and not in the spray process because in the spray process the polyamide granules and plasticizer granules come to lie side-by-side mainly contactless on the substrate and can therefore not affect each other under depression of melting point and fusion viscosity. Even in the case of the powder print-on process such a mixture can only be used where the proportion of plasticiser is not too high, and does not exceed about 10% by weight. If higher plasticizer proportions are used, it is difficult to prevent the gradual clogging of the cavities in the engraved roller. In preparing fixer liners for use in fur and leather fixing, the use of higher proportions of plasticizer is necessary as only extremely mild seal conditions are possible, or otherwise the hairs of the fur and the leather can become damaged.

In addition to the aforementioned heat-sealing adhesives comprising mixtures of polyamide and plasticizer granules next to each other, holt melting adhesive powders based on polyamides have been contemplated in which the plasticizer is added during the polymerization of the polyamide, and the granulate containing the plastiziser is then ground. However, such products of high plastiziser content can only be ground with difficulty, if at all. Most commercially available hot melting adhesives also have the disadvantage that when used for heat-sealing flat textile articles, such as fixer liners and material for outerwear, the adhesive strength decreases. Generally, the adhesive strength of a heat-sealed joint between a fabric liner coated by the powder print-on process and an outerwear material decreases during the first 48 hours to about 75% of the initially measured adhesive strength, and this value further decreases on cleaning to about 50% of the initial value.

It is an object of the present invention to provide modified hot melting adhesives and a method for their preparation, which allows commercially available hot melting adhesives to be so modified that higher quantities of melting point and fusion viscosity depressing agents can be added to the polyamide-based hot melting adhesives without difficulties arising in coating by the powder print-on process. A further object of the invention is to prepare polyamide hot melting adhesives with higher proportions of melting point and fusion viscosity depressing agents in powder form, and to make spray coating possible with such hot melting adhesive powders. A further object of the invention is to lessen the reduction in adhesive strength of a heat-sealed bond.

The present invention in one aspect provides a method of preparing modified hot melting adhesive powders, comprising adding at least one melting point and/or fusion viscosity depressing agent in powder form to a powdered polyamide, wherein the mixture granules are tempered until the added agent is distributed substantially molecularly uniformly in the polyamide granules.

Preferably copolyamide powder with an initial melting point of from 80° to 145° C, more preferably from 100° to 135° C, is tempered together with powdered added agent with an initial melting point of from 50° to 110° C, more preferably from 55° to 95° C, at a temperature above 55° but to a maximum of 3° C above the initial melting point of the optimum molecularly uniform distribution.

The tempered mixture which comprises various granule sizes may suitably comprise from 40 to 97% by weight of copolyamide powder and from 3 to 60% by weight of powdered added agent.

During the tempering process, the original granular additive diffuses under the given temperature conditions into the polyamide granules, and at the end of the tempering process, which may last from a few hours to some days, a largely uniform end product is obtained in powdered or very easily powderable form, in which each granule is of a fairly similar nature, and in which each polyamide granule originally present is molecularly penetrated by the additive. In comparison with the initial mixture, on sieving out different granule fractions substantially no or very small differences can be determined between the individual fractions. Portions of granules free from polyamide are no longer present, or present only to a slight degree. At a treatment temperature of about 70° C, this condition is attained after about 70 to 120 hours, and at a temperature of about 90° C after about 10 to 18 hours, when starting from a polyamide particle size distribution of about 50 to 200 μ.

While the granule sizes of the used additives are generally small, with an average granule diameter of less than 20 μ, the average granule diameter of the polyamide powder is usually in the range of about 120 to 350 μ.

The invention in another aspect provides modified hot melting adhesive powders tempered by the method according to the invention, and which contain the added agent substantially molecularly uniformly distributed in the polyamide. In certain cases other additives, such as hardeners, crosslinking agents, fillers, colouring pigments or optical brighteners may be added to the modified hot melting adhesive powder prepared by the method according to the invention, which is suitable for coating flexible flat sheets by the powder or spray process, and also for coating other objects by the whirl sintering process.

Suitable powdered melting point and fusion viscosity depressing agents for tempering with polyamides or copolyamides are for example o,p-toluenesulphonamide ( a commercially available mixture of o- and p-toluenesulphonamides with an initial melting point of about 95° C), o,p-toluenesulphonic cyclohexylamide, p-toluenesulphonic cyclohexylamide, and caprolactam. Known polyamide plasticisers may constitute up to 60% by weight of the mixture, and are of particular use where the main consideration is a lowering of the melting point and viscosity. The mixture may also contain other agents absorbed with molecular uniformity in the polyamide only within certain limits, and which also reduce the melting point and fusion viscosity, such as dicyclohexylphthalate and fatty acids such as palmitic or stearic acid and their mixtures, such as stearin or acid waxes, like oxidized polyethylene or oxidized montan waxes, in an amount of about 5 to 10% by weight. The latter agents of limited absorption are able to limit the decrease of adhesive strength particularly well. The additives may be contained in the total mixture either alone or in admixture one with another. Preferably several additives are used.

The tempering of the two powdered components, i.e., the polyamide and the melting point and fusion viscosity depressing agent, is preferably carried out by temperature action under motionless conditions or under only slight motion, since by this means the danger of reversal is slight. Slight motion with minimum shear forces may be attained by carrying out the tempering in a slightly inclined slowly rotating pipe, into the higher situated end of which is fed the initial mixture with the final tempered end product being taken from the other lower situated end.

The usable copolyamides are produced by known processes through copolymerization and cocondensation of diamines, dicarboxylic acids, aminoacids and lactams. These commercially available polymerides used for this purpose generally contain a proportion of residual monomers remaining after the preparation process. These are mainly caprolactam in an amount of about 5% by weight. Grinding and sieving aids based on alkaline earth salts of fatty acids are generally added to the commercial copolyamides during grinding and sieving in an amount of 0.01 to 0.05% by weight. Their presence can be useful during the tempering process. After the tempering process it may be necessary or desirable to add a further quantity of such alkaline earth salts up to a maximum of about 1%, especially where the prepared polyamide powders have a very low melting point and are to be used to provide a mesh-shaped coating by the powder print-on process.

For carrying out the tempering process, it is necessary to distribute the additives in the polyamide powder very evenly in order to prevent any local excess concentration of the additives, which could lead to lump formation. At the end of the tempering process, an easily disintegrated powder mixture is obtained which alone only weakly clings together and which can be easily divided into its primary granules by the action of weak mechanical action. The small strongly agglomerated sinter portion, generally under 3%, may be separated by sieving.

A sieve analysis shows that the polyamide granules have grown during the tempering process, and the particle size distribution has shifted to a higher granule diameter. This granule growth corresponds approximately to the volume increase dur to the quantity of added additive.

The preparation method according to the invention is surprising, since it would have been expected that, in the presence of a high proportion of melting point depressing plasticizers, a tempering process close to the melting point would lead to agglomeration of the components of the hot melting adhesive powder and to sintered products with strong lump formation, which could no longer be divided into the required powdered granule form.

A further surprising result of the method according to the invention is that the coating difficulties, which generally increase with increasing proportions of plasticizer, do not occur with the modified hot melting adhesive powder prepared according to the invention. It is also surprising and unexpected that by the tempering process in the presence of melting point and fusion viscosity depressing agents, a considerable reduction in adhesive strength reversal can be obtained. As example 1 below shows, this reduction is present not only on ageing of the fixing bond, but also after cleaning an article of clothing, so producing an increase in the adhesion reliability.

The modified hot melting adhesive powders prepared by the method according to the invention may be used for coating flexible flat sheets by the powder print-on and spray processes. Flat sheets coated in this manner and mostly cut to size are heat-sealed to other flat sheets, likewise mostly cut to size, using pressure and heat. This process, carried out in fixing presses and also known as "fixing," or "ironing" or "heat-sealing coating," is suitable for example for coated fabric and knitting liners, lining materials, fleeces, and foam material, for producing a bond with top materials of articles of clothing, with hat and shirt collar top materials, with natural and synthetic leather and furs of leather and fur clothing and shoes, and for ironing under upholstery covering, floor covering, curtains, and carpets. Fabric, knitting and fleece liners with a coating of a very low melting point material have proved particularly suitable for fixing natural and synthetic furs, because by using liners coated by the powder print-on process for their fixing, any damage to the temperature-sensitive fur hairs is prevented, without loss of their cleaning resistance in the usual cleaning agents such as perchlorethylene. Polyamide-based cleaning resistant adhesive powders worked by the powder print-on process and with appropriate particularly low melting points have been unknown up to the present time.

A further use for the modified hot melting adhesive powders is the working of the powder by the whirl sinter process.

The invention will be further described with reference to the following illustrative Examples. All parts are by weight.

EXAMPLE 1

An evenly distributed mixture was prepared, comprising:
  850 parts of 6/6, 6/12-copolyamide powder
  50 parts of dicyclohexylphthalate powder and
  100 parts of o,p-toluenesulphonamide powder.

The two additives, namely dicyclohexylphthalate and o,p-toluenesulphonamide, were finely ground to an average particle size of under 20 $\mu$, and the unmixed copolyamide powder had the following characteristics:

Monomer proportions:
  approximately 30% lauric lactam
  approximately 40% caprolactam
  approximately 30% - hexamethylenediammoniumadipate.

Particle size distribution:
  Above    150 $\mu$,    0.4%
  180 – 250 $\mu$,    17.0%

125 – 180 μ,   34.0%
90 – 125 μ,   43.0%
below   60 μ,   0.6%
Melting point: approximately 117° C
Fusion viscosity:
   120° C, 200,000 poise
   130° C, 120,000 poise
   140° C, 70,000 poise.

The mixture was tempered at rest at 90° C in a plastic bag for 15 hours and then allowed to cool. After 2 to 3 days the tempered mixture assumed a crystalline condition and disintegrated to powder by means of slight manual rubbing. The tempered product was sieved through a 300 μ brush sieve. About 2% of sintered residue remained. A sieve analysis of the sieved powder gave the following particle size distribution:

above   250 μ,   2.5%
   180 – 250 μ,   27.0%
   125 – 180 μ,   32.0%
   90 – 125 μ,   34.0%
   60 – 90 μ,   4.0%
   below   60 μ,   0.5%
Melting point: approximately 108° C
Fusion viscosity summary:
   at 110° C, 200,000 poise
   at 120° C, 90,000 poise
   at 130° C, 32,000 poise
   at 140° C, 17,500 poise
Fusion viscosity of granule size fraction:
   Above 180 μ
      at 130° C, 33,000 poise
      at 140° C, 18,000 poise
   below 90 μ
      at 130° C, 26,000 poise
      at 140° C, 16,000 poise.

The powder was intensively mixed with 0.05% of magnesium stearate. The resultant very easily flowable mixed product was applied by the powder print-on process in the form of points to an 11 mesh grid on a rayon-cotton fabric liner of approximately 110 g/m² weight. The applied quantity was about 21 g/m². At the same time the same coating quantity of pure copolyamide powder without additives was applied to the same liner.

The following adhesive strength values and adhesive strength losses were measured on a woolen top material, having used a press setting of 165° C top plate temperature, 100° C bottom plate temperature, 15 seconds fixing time and 300 p/cm² pressure:

|  | | Adhesive strength: | |
| --- | --- | --- | --- |
|  | p/5 cm after 30 min | Loss after 48 hours | Loss after one cleaning |
| pure 6/6, 6/12 copolyamide powder | 3,000 | −23% | −51% |
| Sintered powder | 3,500 | 0% | −35% |

Coating difficulties did not arise with the sintered powder.

EXAMPLE 2

A very evenly distributed mixture was prepared comprising:
   300 parts of 6/6, 6/12-copolyamide powder
   30 parts of caprolactam powder and
   280 parts of o,p-toluenesulphonamide powder.

The two finely ground additives, namely caprolactam and o,p-toluene-sulphonamide, had an average granule size of under 20 μ, and the copolyamide powder had the following characteristics:

Monomer proportions:
   approximately 30% lauric lactam
   approximately 40% caprolactam
   approximately 30% - hexamethylenediammoniumadipate Particle size distribution:
   above   250 μ,   0.5%
   180 – 250 μ,   9.0%
   125 – 180 μ,   29.0%
   90 – 125 μ,   38.5%
   60 – 90 μ,   14.0%
   below   60 μ,   9.0%
Melting point: approximately 116° C
Fusion viscosity:
   120° C, 140,000 poise
   130° C, 42,000 poise
   140° C, 18,000 poise The mixture was tempered at rest in a plastic bag for about 80 hours at 68° C, and then allowed to cool. After about three days, the tempered mixture assumed a crystalline condition and disintegrated to powder by light manual rubbing. The tempered product was sieved through a 300 μ brush sieve. About 1% of sintered residue remained on the sieve. A sieve analysis of the sieved powder gave the following particle size distribution:

above   250 μ,   5.0%
   180 – 250 μ,   34.5%
   125 – 180 μ,   33.0%
   90 – 125 μ,   22.0%
   60 – 90 μ,   5.0%
   below   60 μ,   0.5%
Melting point: approximately 66° C
Fusion viscosity summary:
   at 70° C, 35,000 poise
   at 80° C, 9,000 poise
   at 90° C, 4,000 poise
   at 100° C, 2,000 poise
Fusion viscosity of the granule size fraction:
   above 180 μ at 180° C, 10,000 poise
   below 90 μ at 180° C, 6,000 poise.

The powder was intensively mixed with 0.2% of magnesium stearate and was applied by the powder print-on process in points corresponding to an 11 mesh grid on a rayon-cotton liner of approximately 80 g/m² weight. The applied quantity was approximately 25 g/m².

The coated liner was used for heat-sealing furs and leather. The temperature acting on the adhesive points during the distribution process was about 85° C. The bond was resistant to cleaning in perchlorethylene, and resistant to washing at a wash temperature of 30° C.

I claim:

1. A method of preparing modified hot melting adhesive powders, comprising adding at least one melting point and fusion viscosity depressing agent in powder form to powdered polyamide, with the powders being mixed into a substantially homogeneous mixture, said polyamide comprising a copolyamide powder with an initial melting point of from 80° to 145° C and said powdered added agent having an initial melting point of from 50° to 110° C tempering said mixture at a temperature above 55° C but to a maximum of 3° C above the initial melting point of an optimum molecularly uniform distribution and continuing said tempering until said added agent is diffused substantially uniformly into said polyamide granules.

2. A method according to claim 1, wherein the copolyamide powder has an initial melting point of from 100° to 135° C.

3. A method according to claim 1, wherein the powdered added agent has an initial melting point of from 55° to 95° C.

4. A method according to claim 1, comprising tempering a granule mixture comprising from 40 to 97% by weight of copolyamide powder and from 3 to 60% by weight of powdered added agent.

5. A method according to claim 1, comprising tempering copolyamide powder with at least one addition selected from the group consisting of powdered o,p-toluenesulphonamide, o,p-toluenesulphonic cyclohexylamide, p-toluenesulphonic cyclohexylamide, caprolactam, dicyclohexylphthalate, fatty acid, oxidized polyethylene, oxidized montan waxes.

6. A method according to claim 1, comprising tempering a mixture of copolyamide powder and powdered added agent at rest.

7. A method according to claim 1, comprising tempering a mixture of copolyamide powder and powdered added agent under weak movement and substantially without shearing.

8. A method according to claim 1, comprising tempering a mixture of copolyamide powder and powdered added agent in an inclined rotating pipe, the initial mixture being fed into the higher situated end of the pipe and the finished tempered end product being taken from the other lower situated end of the pipe.

9. A modified hot melting adhesive powder containing a melting point and fusion viscosity depressing agent uniformly diffused into a copolyamide having a melting point of 80° to 145° C, said powder consisting of substantially uniformly sized particles, the majority of which have particle sizes of from 90 to 250 microns.

10. A method of coating by the powder print-on process, utilizing a modified hot melting adhesive powder according to claim 9.

11. A method of coating by the spray process, utilizing a modified hot melting adhesive powder according to claim 9.

12. A method of coating by the whirl sinter process, utilizing a modified hot melting adhesive powder according to claim 9.

* * * * *